United States Patent [19]
Tae

[11] Patent Number: 5,739,778
[45] Date of Patent: Apr. 14, 1998

[54] DIGITAL DATA FORMATTING/ DEFORMATTING CIRCUITS

[75] Inventor: Won Kun Tae, Seoul, Rep. of Korea

[73] Assignee: LG Electroncis Inc., Seoul, Rep. of Korea

[21] Appl. No.: 429,733

[22] Filed: Apr. 25, 1995

[30] Foreign Application Priority Data

Apr. 25, 1994 [KR] Rep. of Korea ............... 8747/1994

[51] Int. Cl.⁶ .................................................. H03M 7/00
[52] U.S. Cl. ............................. 341/55; 341/95; 341/102; 364/239.2
[58] Field of Search ..................... 341/60, 55, 95, 341/100, 101, 102; 364/219, 239.2, 239.3, 939.2, 939.3

[56] References Cited

U.S. PATENT DOCUMENTS

| | | | |
|---|---|---|---|
| 4,376,933 | 3/1983 | Saran et al. | 341/67 |
| 5,210,639 | 5/1993 | Redwine et al. | 395/431 |
| 5,341,374 | 8/1994 | Lewen et al. | 370/85.4 |
| 5,600,815 | 2/1997 | Lin et al. | 395/436 |

*Primary Examiner*—Jeffrey A. Gaffin
*Assistant Examiner*—Thuy-Trang N. Huynh

[57] ABSTRACT

Digital data formatting/deformatting circuits perform digital data formatting/deformatting operations separately from a digital signal processor to reduce the required time and power consumption in formatting and deformatting digital data. In the formatting operation, the data to be formatted are arranged in a line and then outputted in the unit of a desired number of bits. In the deformatting operation, the formatted data are arranged in a line and then outputted in the unit of the original number of bits.

10 Claims, 4 Drawing Sheets

DIGITAL DATA FORMATTING/ DEFORMATTING CIRCUITS

BACKGROUND OF THE INVENTION

1. Field of the Invention

The present invention relates in general to digital data formatting/deformatting circuits, and more particularly to digital data formatting/deformatting circuits for performing digital data formatting/deformatting operations separately from a digital signal processor to reduce the required time and power consumption in formatting and deformatting digital data.

2. Description of the Prior Art

Generally, digital data must be compressed for transmission or recording thereof because of a limited band width of a transmission medium or a limited capacity of a recording medium. In order to compress the digital data, there are performed various data processing steps, one of which is to quantize coded data. The quantized data are formatted in a desired form and then transmitted or recorded. By the way, many calculations are carried out in the quantization process. In order to execute such many calculations within a short time, there is mainly used an integrated circuit which is called a digital signal processor.

In compressing the digital data, conventionally, the quantization and formatting processes are performed by the digital signal processor, as shown in FIG. 1 which is a block diagram of a conventional circuit for quantizing the digital data and formatting the quantized data. As shown in FIG. 1, the conventional circuit comprises a data random access memory (referred to hereinafter as RAM) 10 for storing the digital data to be quantized, at an interval of unit. The data RAM 10 also stores a word length WL and a scale factor SF of each of the digital data units and the quantized data QD.

The conventional circuit further comprises a program read only memory (referred to hereinafter as ROM) 30 for storing a program for quantizing the digital data to be quantized, stored in the data RAM 10, and a digital signal processor 20 for quantizing the digital data to be quantized, stored in the data RAM 10, according to the quantization program stored in the program ROM 30 and outputting the quantized data QD to the data RAM 10. The digital signal processor 20 also formats the quantized data QD in a desired form.

The operation of the conventional circuit with the above-mentioned construction will hereinafter be described with reference to FIGS. 1 to 3B.

Assuming that the digital data to be quantized are 512 in number and the units to be allocated are 52 in number, the 512 digital data are allocated to the 52 units through a bit allocation process. In the bit allocation process, the number of the digital data allocated to the units may be the same or different from one another according to the quantization program stored in the program ROM 30. The number of the digital data allocated to the units are stored in the program ROM 30. Stored in the data RAM 10 are the word length WL and the scale factor SF of each of the digital data units obtained in the bit allocation process.

If the bit allocation process is ended, the digital signal processor 20 quantizes the digital data of each unit stored in the data RAM 10 according to the quantization program stored in the program ROM 30. Namely, the digital signal processor 20 reads the digital data of each unit and the word length WL and the scale factor SF of the corresponding unit and quantizes the read digital data using the read corresponding word lengths WL and scale factors SF according to the quantization program stored in the program ROM 30. Then, the digital signal processor 20 stores the quantized data QD into a desired area of the data RAM 10.

FIG. 2 is a view illustrating quantization blocks of the digital data quantized by the digital signal processor 20. The quantized data are stored in the data RAM 10 in the form of the quantization blocks as shown in FIG. 2. FIG. 2 shows a unit 0 in which the digital data are 8 in number and the word length WL is 5 and a unit 51 in which the digital data are 20 in number and the word length WL is 3.

If the quantization process is completed in the above-mentioned manner, the digital signal processor 20 formats the quantized data QD, the word lengths WL and the scale factors SF in a desired form. As a result, the formatted digital data are transmitted or recorded. FIGS. 3A and 3B are views illustrating a process in which the word lengths WL, the scale factors SF and the quantized data QD are formatted in an 8-bit length by the digital signal processor 20. In FIG. 3A, each of the word lengths WL is shown to be given 4 bits and each of the scale factors SF is shown to be given 6 bits. The word lengths WL of the 52 units in FIG. 2 are sequentially stored in the data RAM 10. Also, the scale factors SF of the 52 units are sequentially stored in the data RAM 10. Similarly, the quantized data QD of the 52 units are sequentially stored in the data RAM 10. The formatting process is to arrange the word lengths WL, the scale factors SF and the quantized data QD which are present in the data RAM 10 in the form as shown in FIG. 3A, sequentially by 8 bits as shown in FIG. 3B. To this end, the word lengths WL are sequentially arranged from the first unit to the last unit and the scale factors SF are then sequentially arranged from the first unit to the last unit. Then, the quantized data QD are sequentially arranged from the first unit to the last unit. For example, provided that the 6-bit scale factor of a certain unit was arranged from a most significant bit (MSB) to the sixth bit, the preceding 2 bits of the scale factor of the next unit are arranged subsequently to the previously arranged scale factor on the same line and the remaining 4 bits thereof are arranged on the next line. The word lengths, the scale factors and the quantized data formatted in the above-mentioned manner are transmitted through the transmission medium or recorded on the recording medium. On the other hand, a deformatting process is performed in the reverse order of the above-mentioned formatting process.

However, the digital signal processor 20 is mainly implemented for arithmetic operations such as an FIR filter calculation, a fast Fourier transform (FFT) calculation and etc. For this reason, a processing time is delayed and power consumption is increased when the digital data of the irregular bits number are formatted in the unit of the desired bits number or the digital data formatted in the unit of the desired bits number are deformatted into the original bits number.

SUMMARY OF THE INVENTION

Therefore, the present invention has been made in view of the above problem, and it is an object of the present invention to provide digital data formatting/deformatting circuits for performing digital data formatting/deformatting operations separately from a digital signal processor to reduce the required time and power consumption in formatting and deformatting digital data.

In accordance with one aspect of the present invention, there is provided a digital data formatting circuit comprising a data random access memory for storing data to be formatted; program storage means for storing a program for allowing the data stored in the data random access memory to be outputted in the unit of a first desired number of bits and controlling an address generation operation; address generation and parallel/serial conversion means for converting the output data from the data random access memory into serial data and generating addresses regarding the serial data under the control of the program storage means; data storage means for storing sequentially the serial data from the address generation and parallel/serial conversion means in response to the addresses therefrom; and data output means for inputting the serial data from the data storage means and outputting the input data in the unit of a second desired number of bits.

In accordance with another aspect of the present invention, there is provided a digital data deformatting circuit comprising bit conversion means for inputting data formatted in the unit of a first desired number of bits and outputting the input data in the unit of 1 bit, the bit conversion means outputting addresses corresponding to its output data; data storage means for storing sequentially the output data from the bit conversion means in response to the addresses therefrom; program storage means for storing a program for controlling an address generation operation to deformat the formatted data into the original form; address generation and serial/parallel conversion means for inputting serial data from the data storage means and outputting parallel data in the unit of a second desired number of bits under the control of the program storage means, the address generation and serial/parallel conversion means generating addresses regarding the parallel data under the control of the program storage means; and a data random access memory for storing the parallel data from the address generation and serial/parallel conversion means in response to the addresses therefrom.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 4:
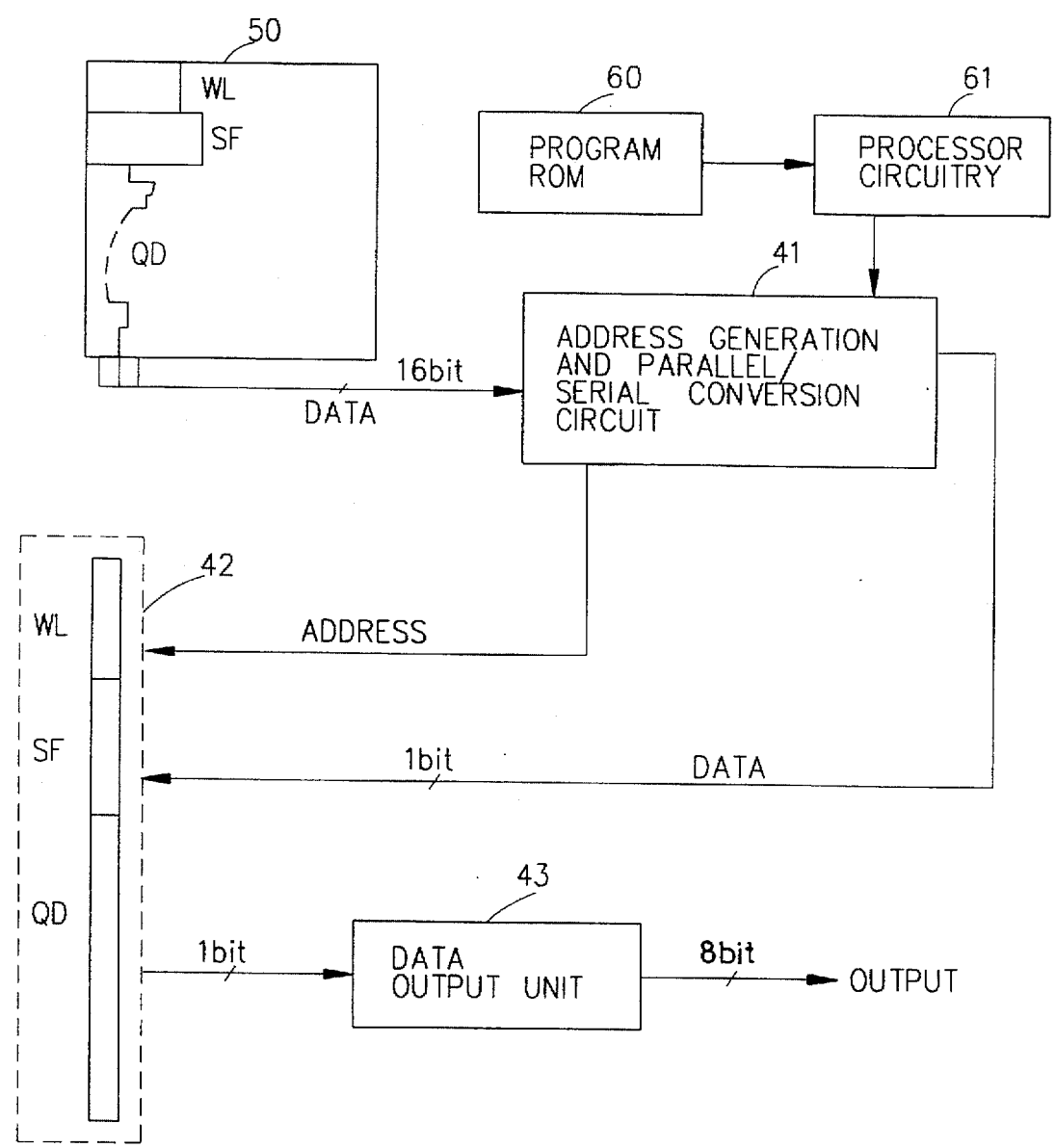
FIG. 4 is a block diagram of a digital data formatting circuit in accordance with the present invention.

Referring to FIG. 4, there is shown a block diagram of a digital data formatting circuit in accordance with the present invention. As shown in this drawing, the digital data formatting circuit comprises a data RAM 50 for storing word lengths WL, scale factors SF and quantized data QD, a program ROM 60 for storing a program for allowing the data stored in the data RAM 50 to be outputted in the unit of a first desired number of bits and controlling an address generation operation, processing circuitry 61 for reading and executing the program in the ROM 60 and an address generation and parallel/serial conversion circuit 41 for converting the output data from the data RAM 50 into serial data. The address generation and parallel/serial conversion circuit 41 also generates addresses regarding the serial data under the control of the processing circuitry 61 executing the program ROM 60.

The digital data formatting circuit further comprises a data storage unit 42 for storing the serial data from the address generation and parallel/serial conversion circuit 41 in response to the addresses therefrom, and a data output unit 43 for inputting the serial data from the data storage unit 42 in the unit of 1 bit and outputting the input data in the unit of a second desired number of bits.

The data storage unit 42 may be a 1-bit RAM, i.e., a RAM organized as a plurality of 1-bit storage locations, an N×1 RAM.

The operation of the digital data formatting circuit with the above-mentioned construction in accordance with the present invention will hereinafter be described in detail.

Figure 1:
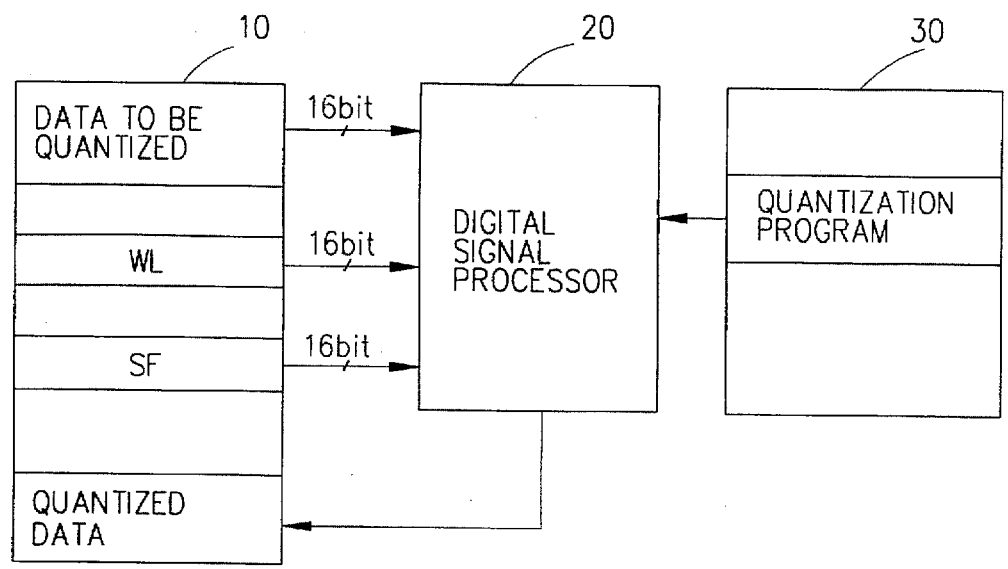
FIG. 1 is a block diagram of a conventional circuit for quantizing digital data and formatting the quantized data.
Figure 2:
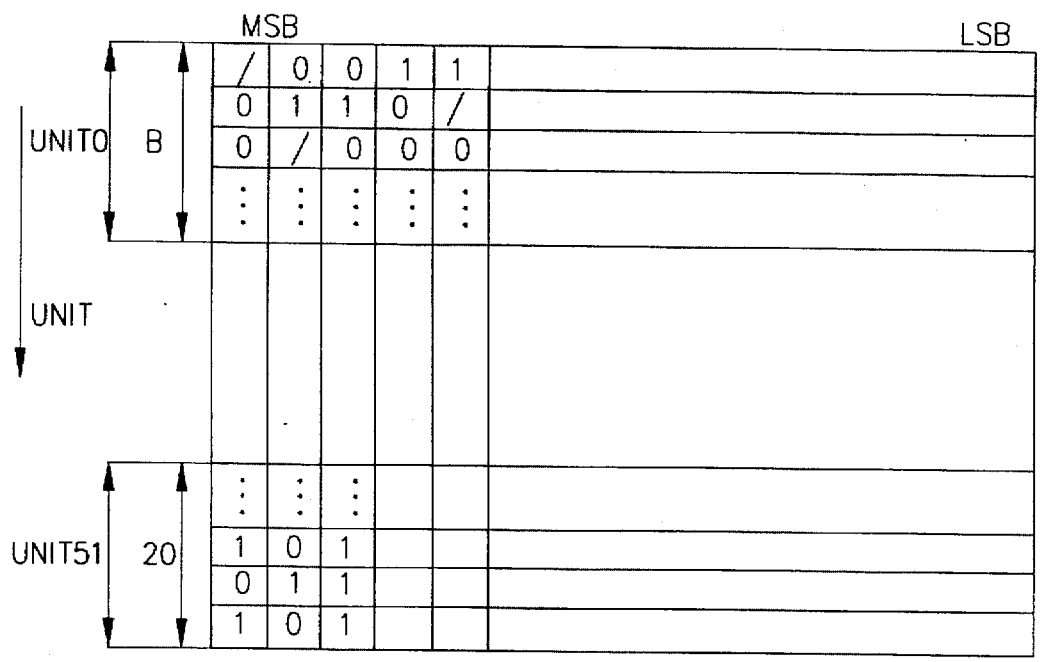
FIG. 2 is a view illustrating quantization blocks of the digital data quantized by the conventional circuit in FIG. 1.
Figure 3A:
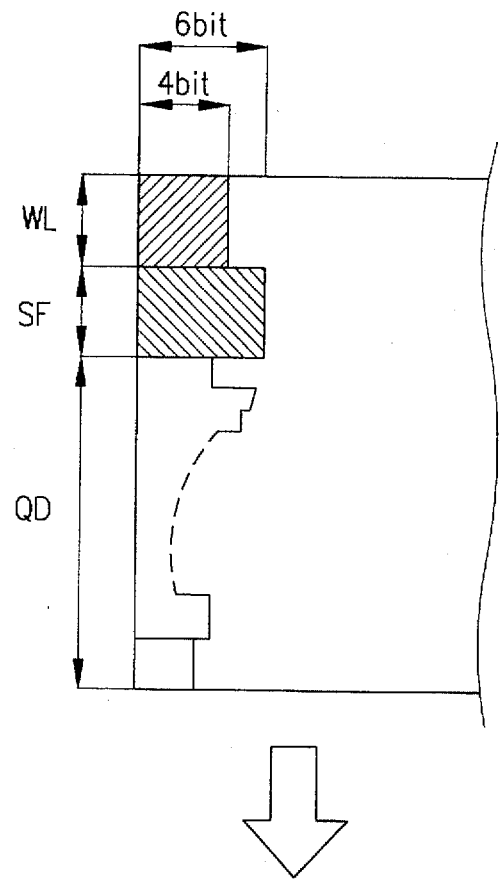
FIGS. 3A and 3B are views illustrating a process in which the quantized data are formatted in the unit of 8 bits by the conventional circuit in FIG. 1.
Figure 3B:
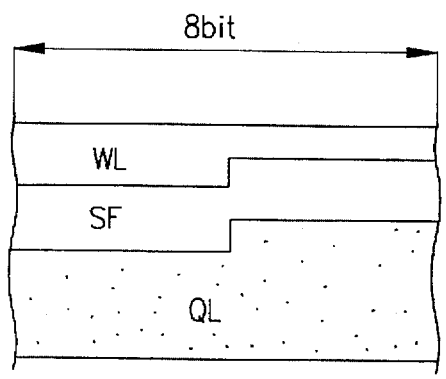

The word lengths WL, the scale factors SF and the quantized data QD are stored in the data RAM 50 in the form as shown in FIG. 3A and then outputted as the parallel data in the unit of the first desired number of bits, for example, 16 bits under the control of the processing circuitry 61 executing the program in the ROM 60 for the formatting thereof. The 16-bit parallel data from the data RAM 50 are converted into the serial data by the address generation and parallel/serial conversion circuit 41 according to the the program in the ROM 60 and then stored into the data storage unit 42. Also according to the program ROM 60, the address generation and parallel/serial conversion circuit 41 generates the addresses of the serial data to be stored in the data storage unit 42.

The data storage unit 42 stores the serial data from the address generation and parallel/serial conversion circuit 41 in its locations corresponding to the addresses therefrom, so as to arrange the word lengths WL, the scale factors SF and the quantized data QD in the form as shown in FIG. 3A in a line. Namely, the word lengths WL are sequentially arranged and the scale factors SF are then sequentially arranged. The quantized data QD are sequentially arranged subsequently to the scale factors SF. In order to format the word lengths WL, the scale factors SF and the quantized data QD arranged in a line in the above-mentioned manner, in an 8-bit length, the data output unit 43 outputs the sequential output data from the data storage unit 42 by the bundle in the unit of the second desired number of bits, for example, 8 bits. As mentioned above, according to the present invention, the digital data formatting circuit merely divides the data in the unit of 8 bits using the data output unit 43. Therefore, there is no necessity for arranging the data of the irregular bits number one by one by 8 bits.

On the other hand, for data reception or reproduction, the formatted data must be deformatted into the original form before an expansion process is performed.

Figure 5:
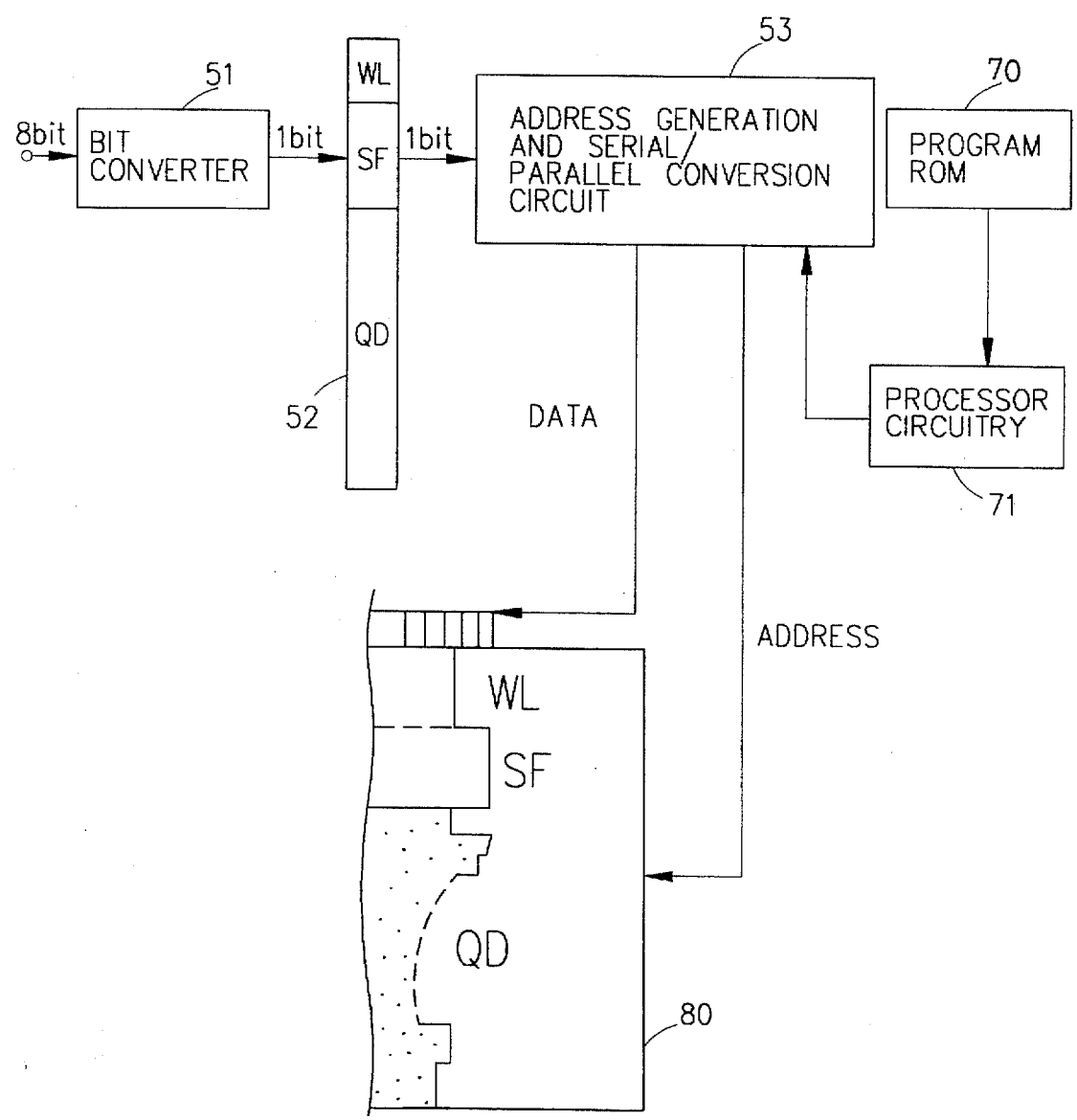
FIG. 5 is a block diagram of a digital data deformatting circuit in accordance with the present invention.

Referring to FIG. 5, there is shown a block diagram of a digital data deformatting circuit in accordance with the present invention. As shown in this drawing, the digital data deformatting circuit comprises a bit converter 51 for inputting data formatted in the unit of 8 bits and outputting the input data in the unit of 1 bit. The bit converter 51 also outputs addresses corresponding to its output data.

The digital data deformatting circuit further comprises a data storage unit 52 for storing sequentially the output data from the bit converter 51 in response to the addresses therefrom, and an address generation and serial/parallel conversion circuit 53 for inputting serial data from the data storage unit 52 in the unit of 1 bit and outputting parallel data in the unit of 16 bits under control of processing circuitry 71 executing a program ROM 70. The address generation and serial/parallel conversion circuit 53 also generates addresses for its output parallel data according to the program in the ROM 70.

The digital data deformatting circuit further comprises a data RAM 80 for storing the parallel data from the address generation and serial/parallel conversion circuit 53 in response to the addresses therefrom. The program ROM 70 is adapted to store a program for controlling the deformatting operation.

The data storage unit 52 may be a 1-bit RAM.

The operation of the digital data deformatting circuit with the above-mentioned construction in accordance with the present invention will hereinafter be described in detail.

The bit converter 51 inputs the data formatted in the unit of 8 bits and outputs the input data in the unit of 1 bit. Because it was previously assumed that the word lengths WL are 52 by 4 bits and the scale factors SF are 52 by 6 bits, the data storage unit 52 stores sequentially the 1-bit data from the bit converter 51 in the same manner as that of the data storage unit 42 in FIG. 4. The address generation and serial/parallel conversion circuit 53 inputs free serial data from the data storage unit 52 in the unit of 1 bit and outputs the parallel data in the unit of 16 bits according to the quantization program stored in the program ROM 70. The program ROM 70 has the information regarding the word lengths WL, the scale factors SF and the quantized data QD before the formatting. On the basis of this information, the program in the ROM 70 allows the address generation and serial/parallel conversion circuit 53 to generate the appropriate addresses. Then, the data RAM 80 stores the parallel data from the address generation and serial/parallel conversion circuit 53 in its locations corresponding to the addresses therefrom. As a result, the word lengths WL, the scale factors SF and the quantized data QD are stored in the data RAM 80 in the original form. Therefore, the deformatting operation is completed.

As apparent from the above description, according to the present invention, the digital data formatting/deformatting circuits perform the digital data formatting/deformatting operations separately from a digital signal processor. Therefore, the required time and power consumption can be reduced in formatting and deformatting the digital data. In the formatting operation, the data to be formatted are arranged in a line and then outputted in the unit of the desired number of bits. In the deformatting operation, the formatted data are arranged in a line and then outputted in the unit of the original number of bits. These have the effect of enhancing an operating performance. Further, the digital data formatting/deformatting circuits of the present invention may utilize a part of the digital signal processor or be implemented at the outside of the digital signal processor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A digital data deformatting circuit comprising:

bit conversion means for converting a stream of N-bit words, N being a positive integer, into a stream of 1-bit words, said bit conversion means also being operable to output addresses corresponding to said stream of 1-bit words;

a first memory for storing sequentially the stream of 1-bit words from said bit conversion means in response to said addresses therefrom;

address generation and serial/parallel conversion means for reading a stream of 1-bit words from said first memory and for outputting a said stream of M-bit words, M being a positive integer, M≧N, said address generation and serial/parallel conversion means also being operable to generate addresses of words of said stream of M-bit words; and a second memory for storing the stream of N-bit words from said address generation and serial/parallel conversion means in response to said addresses therefrom.

2. A digital data formatting circuit as set forth in claim 1, wherein said first memory is an N×1 RAM, where N is a positive integer.

3. A quantized data formatting circuit for formatting quantized data and word length data and scale factor data relating to said quantized data, represented as M-bit words, M being a positive integer, the apparatus comprising:

a parallel/serial converter, operable to receive in parallel a stream of said M-bit quantized data, and said word length data and scale factor data, for converting said stream of M-bit data to a stream of 1-bit words, and for outputting said stream of 1-bit words to a memory;

an address generator for generating addresses at which to score words said of scream of 1-bit words in said memory so as to arrange consecutively said word length data and scale factor data in locations of said memory prior to locations in said memory for said quantized data;

said memory, organized as a plurality of one-bit storage locations, for storing said stream of 1-bit words from said parallel/serial converter according to addresses from said address generator; and a serial/parallel converter for receiving a stream of 1-bit words from said memory and for converting said stream of 1-bit words into a stream of N-bit words, N being a positive integer, N≦M, and for outputting said stream of N-bit words in N-bit parallel format.

4. The circuit as in claim 3, wherein M=16 and N=8.

5. A method for formatting quantized data and word length data and scale factor data relating to said quantized data, represented as M-bit words, M being a positive integer, in a memory, the method comprising the steps of:

receiving a scream of said M-bit quantized data word, length data and scale factor data, converting said stream of M-bit data to stream of 1-bit words, and outputting said stream of 1-bit words to a memory organized as a plurality of 1-bit storage locations;

generating addresses at which to store words of said stream of 1-bit words in said memory; and storing said stream of 1-bit words so as to consecutively arrange said word length data and said scale factor in said memory at locations prior to locations of said quantized data in said memory;

receiving a stream of 1-bit words from said memory and converting said stream of 1-bit words into a stream of N-bit words, N being a positive integer, N≦M, and outputting said stream N-bit words in N-bit parallel format.

6. The method as in claim 5, wherein M=16 and N=8.

7. A quantized data deformatting circuit comprising:

a parallel/serial converter for converting quantized data, and word length data and scale factor data relating to said quantized data, arranged as a stream of N-bit words, N being a positive integer, into a stream of 1-bit words, and for storing said stream of 1-bit words in a first memory such that said word length data and scale factor data are arranged in locations of a first memory prior to locations of said quantized data in said first memory;

said first memory, organized as a plurality of 1-bit storage locations, for storing said stream of 1-bit words from said parallel/serial converter;

a serial/parallel converter for receiving a stream of 1-bit words from said first memory and for converting said stream of 1-bit words into a stream of M-bit words, M being a positive integer, M≧N, and for outputting said stream M-bit words to a second memory organized as a plurality of M-bit storage locations; and an address generator for generating addresses at which to store words of said stream of M-bit words in said second memory.

8. The circuit as in claim 7, wherein M=16 and N=8.

9. A method for deformatting quantized data comprising the steps of:

converting said quantized data and word length data and scale factor data relating to said quantized data, arranged as a stream of N-bit words, N being a positive integer, into a stream of 1 words, and outputting said stream of 1-bit words;

storing said stream of 1-bit words into a first memory organized as a plurality of one bit storage locations such that said word length data and scale factor data are arranged consecutively at locations in said first memory located prior to locations of said quantized data;

receiving a stream of 1-bit words from said first memory and for converting said stream of 1-bit words into a stream of M-bit words, M being a positive integer, M≧N, and outputting said stream of M-bit words to a second memory organized as a plurality of M-bit storage locations; and generating addresses at which to store words of said stream of M-bit words in said second memory.

10. The method as in claim 9, wherein M=16 and N=8.

* * * * *